(12) United States Patent
Kim et al.

(10) Patent No.: US 9,094,640 B2
(45) Date of Patent: Jul. 28, 2015

(54) TERMINAL AND METHOD FOR OUTPUTTING INFORMATION

(75) Inventors: In Hwan Kim, Seoul (KR); Chang Soo Kim, Anyang-si (KR); Kwang Hyo Son, Guri-si (KR)

(73) Assignee: LG ELECTRONICS INC., Seoul (KR)

( * ) Notice: Subject to any disclaimer, the term of this patent is extended or adjusted under 35 U.S.C. 154(b) by 1133 days.

(21) Appl. No.: 12/134,069

(22) Filed: Jun. 5, 2008

(65) Prior Publication Data

US 2008/0307452 A1 Dec. 11, 2008

(30) Foreign Application Priority Data

Jun. 5, 2007 (KR) .......................... 10-2007-0054937

(51) Int. Cl.
*H04N 21/4402* (2011.01)
*G06F 17/30* (2006.01)
(Continued)

(52) U.S. Cl.
CPC ............ *H04N 5/50* (2013.01); *G06F 17/30796* (2013.01); *G10L 15/26* (2013.01); *H04N 5/445* (2013.01); *H04N 21/41407* (2013.01); *H04N 21/4312* (2013.01); *H04N 21/4335* (2013.01); *H04N 21/4383* (2013.01); *H04N 21/4424* (2013.01); *H04N 21/440236* (2013.01); *H04N 21/4622* (2013.01); *H04N 21/47202* (2013.01); *H04N 21/482* (2013.01); *H04N 21/4882* (2013.01); *H04N 21/6131* (2013.01); *H04N 21/6181* (2013.01); *H04N 21/812* (2013.01);
(Continued)

(58) Field of Classification Search
CPC .................... H04N 21/6543; H04N 21/44204; H04N 21/812; H04N 21/440236; G06F 17/30796; G10L 15/26

USPC ......... 725/37–39, 58, 59, 86–89, 91–93, 105, 725/109, 110, 114–116; 386/1, 34, 35, 40, 386/46, 92, 124, 131, 200, 219, 220, 235, 386/262, 291, 299, 341
See application file for complete search history.

(56) References Cited

U.S. PATENT DOCUMENTS 5,583,864 A * 12/1996 Lightfoot et al. ............. 370/396
5,990,933 A 11/1999 Ozone et al.
(Continued)

FOREIGN PATENT DOCUMENTS

CN 1663260 8/2005
CN 1886986 12/2006
(Continued)

OTHER PUBLICATIONS

European Patent Office Application Serial No. 08010056.3, Office Action dated Dec. 20, 2012, 7 pages.

*Primary Examiner* — Benjamin R Bruckart
*Assistant Examiner* — Jason Thomas
(74) *Attorney, Agent, or Firm* — Lee, Hong, Degerman, Kang & Waimey

(57) ABSTRACT

A terminal and method for outputting information are provided. The method includes the terminal performing a broadcast-related operation, outputting information having an output amount while performing the broadcast-related operation and subsequently outputting an amount of the information that was not output during the broadcast related operation when the broadcast-related operation is completed. Therefore, it is possible to fully provide useful information to the user during a wait time generated in connection with a broadcast mode.

28 Claims, 22 Drawing Sheets

(51) Int. Cl.

| | |
|---|---|
| *G10L 15/26* | (2006.01) |
| *H04N 5/50* | (2006.01) |
| *H04N 5/445* | (2011.01) |
| *H04N 21/414* | (2011.01) |
| *H04N 21/431* | (2011.01) |
| *H04N 21/4335* | (2011.01) |
| *H04N 21/438* | (2011.01) |
| *H04N 21/442* | (2011.01) |
| *H04N 21/462* | (2011.01) |
| *H04N 21/472* | (2011.01) |
| *H04N 21/482* | (2011.01) |
| *H04N 21/488* | (2011.01) |
| *H04N 21/61* | (2011.01) |
| *H04N 21/81* | (2011.01) |
| *H04N 21/485* | (2011.01) |

(52) U.S. Cl.
CPC ........ *H04N 21/4316* (2013.01); *H04N 21/4858* (2013.01)

(56) References Cited

U.S. PATENT DOCUMENTS

| | | | |
|---|---|---|---|
| 7,313,375 B2 * | 12/2007 | Lee et al. .................... 455/186.1 |
| 8,745,656 B2 * | 6/2014 | Rodriguez et al. .............. 725/32 |
| 2001/0040621 A1 | 11/2001 | Gerszberg et al. |
| 2001/0054181 A1 | 12/2001 | Corvin |
| 2002/0087973 A1 | 7/2002 | Hamilton et al. |
| 2002/0144262 A1 * | 10/2002 | Plotnick et al. ................. 725/32 |
| 2002/0178447 A1 | 11/2002 | Plotnick et al. |
| 2003/0226141 A1 * | 12/2003 | Krasnow et al. .................. 725/9 |
| 2004/0268400 A1 | 12/2004 | Barde et al. |
| 2005/0273830 A1 | 12/2005 | Silver et al. |
| 2006/0101488 A1 * | 5/2006 | Cho .............................. 725/39 |

FOREIGN PATENT DOCUMENTS

| | | |
|---|---|---|
| CN | 1901461 | 1/2007 |
| WO | WO 2005060244 A1 * | 6/2005 |
| WO | 2005062620 | 7/2005 |
| WO | WO 2008044085 A1 * | 4/2008 |

* cited by examiner

TERMINAL AND METHOD FOR OUTPUTTING INFORMATION

CROSS-REFERENCE TO RELATED APPLICATION

This application claims the benefit of Korean Patent Application No. 10-2007-0054937, filed on Jun. 5, 2007, which is hereby incorporated by reference as if fully set forth herein.

BACKGROUND OF THE INVENTION

1. Field of the Invention

The present invention relates to a terminal and method for outputting information.

2. Discussion of the Related Art

A broadcast receivable terminal generally displays a pre-stored basic image as a default image during operations that generate a wait time in a broadcast mode, such as a broadcast channel entry, broadcast channel change and broadcast channel search. Therefore, a user of the terminal may not appreciate a monotonous image provided during the wait time or may desire to receive various information during the wait time.

A terminal may now provide various information during the wait time with the recent development of a technique capable of providing information related to broadcast programs during a wait time. However, the terminal stops providing the information and outputs a broadcast signal when the wait time expires. Therefore, the terminal user may be inconvenienced by not fully receiving information because providing the information is impossible after the expiration of the wait time.

SUMMARY OF THE INVENTION

In one aspect of the present invention, a method for displaying broadcast content on a terminal is provided. The method includes receiving first content obtained from a newly selected broadcast channel, displaying information including second content different than the first content and continuing to display the information for a predetermined time period even if the first content obtained from the newly selected broadcast channel is available for display.

It is contemplated that the method further includes displaying the first content only after display of the information has been completed. It is further contemplated that the first content includes at least one of audio, video, and text.

It is contemplated that the second content includes an advertisement. It is further contemplated that the method further includes switching from a current broadcast channel to the newly selected broadcast channel prior to receiving the first content.

It is contemplated that the method further includes searching available broadcast channels to identify the newly selected broadcast channel prior to receiving the first content. It is further contemplated that the method further includes determining that a current broadcast channel is unavailable for continued display and switching from the current broadcast channel to the newly selected broadcast channel prior to receiving the first content.

It is contemplated that the method further includes receiving a purchase request for the newly selected broadcast channel prior to receiving the first content. It is further contemplated that the method further includes receiving the information including second content via either a broadcast network or a mobile communication network within which the terminal operates.

It is contemplated that the method further includes receiving the information including second content from storage located within the terminal. It is further contemplated that the method further includes receiving the information including second content from a remote server. Preferably, the information including second content includes one of a plurality of different types of content and the method further includes deleting a certain amount of the plurality of different types of content when an amount of the plurality of different types of content exceeds a threshold.

In another aspect of the present invention, a terminal for displaying broadcast content is provided. The terminal includes a broadcasting module receiving broadcast content, an output unit displaying information and a controller controlling the broadcasting module to receive first content obtained from a newly selected broadcast channel and controlling the output unit to display information including second content different than the first content such that the output unit continues displaying the information including second content for a predetermined time period even if the first content obtained from the newly selected broadcast channel is available for display.

It is contemplated that the controller further controls the output unit to display the first content only after display of the information including second content has been completed. It is further contemplated that the first content includes at least one of audio, video, and text.

It is contemplated that the second content includes an advertisement. It is further contemplated that the controller further controls the broadcasting module to switch from a current broadcast channel to the newly selected broadcast channel prior to receiving the first content.

It is contemplated that the controller further controls the broadcasting module to search available broadcast channels to identify the newly selected broadcast channel prior to receiving the first content. It is further contemplated that the controller further determines that a current broadcast channel is unavailable for continued display and controls the broadcasting module to switch from the current broadcast channel to the newly selected broadcast channel prior to receiving the first content.

It is contemplated that the terminal further includes an input unit receiving a purchase request for the newly selected broadcast channel prior to the broadcasting module receiving the first content. It is further contemplated that the broadcasting module receives the information including second content via either a broadcast network or a mobile communication network within which the terminal operates.

It is contemplated that the terminal further includes a storage unit storing information and the controller receives the information including second content from the storage unit. It is further contemplated that the broadcasting module receives the information including second content from a remote server. Preferably, the information including second content includes one of a plurality of different types of content and the controller further deletes a certain amount of the plurality of different types of content when an amount of the plurality of different types of content exceeds a threshold.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the invention rather unclear.

Figure 1:
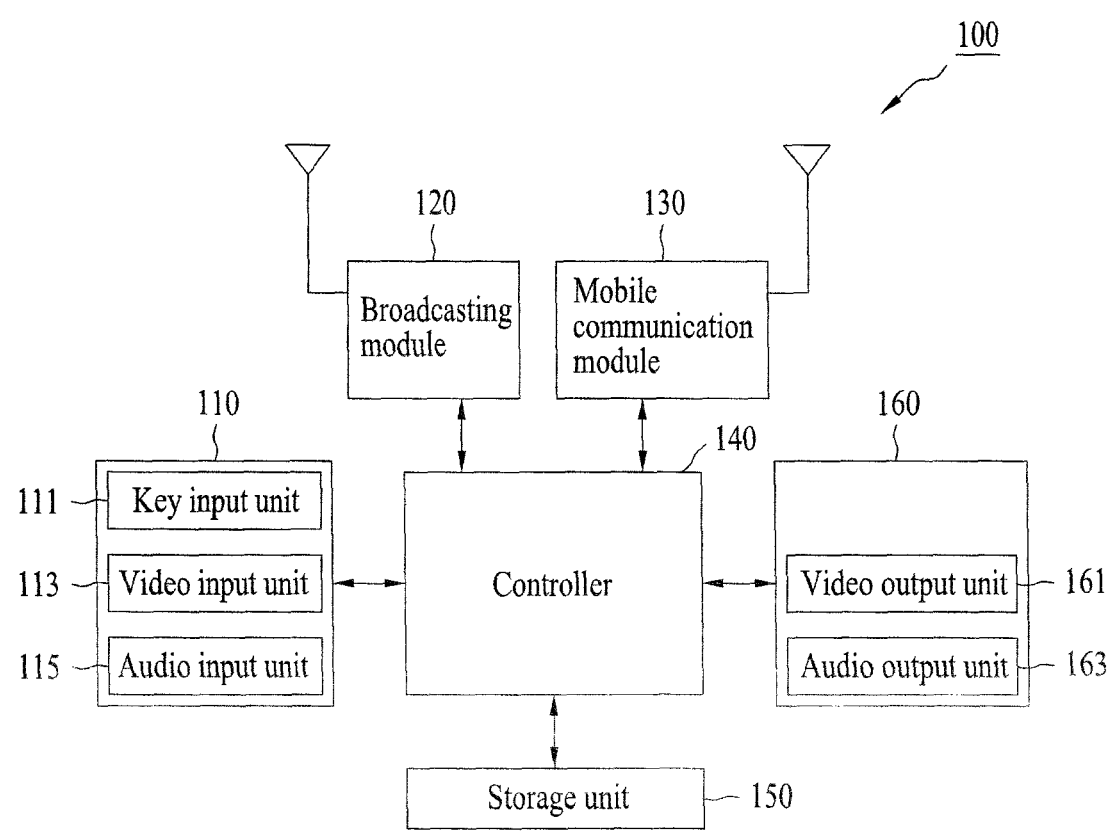
FIG. 1 is a block diagram showing the configuration of an embodiment of a terminal with an information output function according to the present invention.
Figure 2:
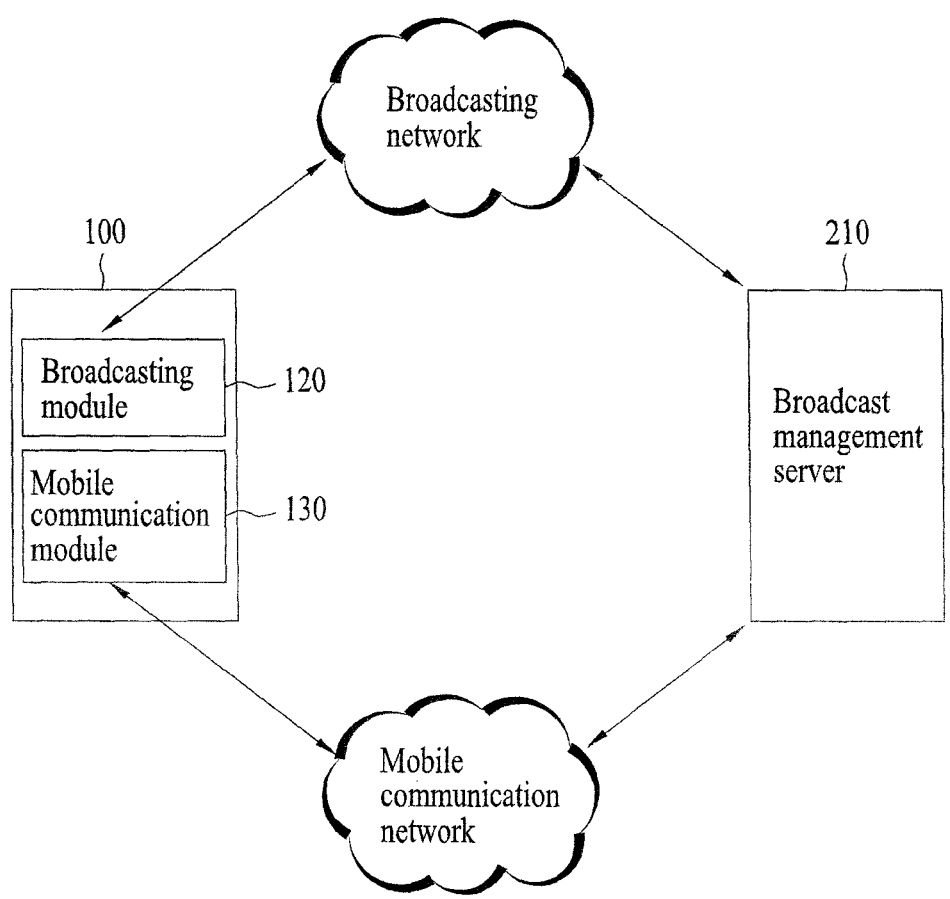
FIG. 2 is a block diagram of an embodiment of a system providing information to the terminal shown in FIG. 1.

A terminal 100 with an information output function according to the present invention will hereinafter be described in detail with reference to FIGS. 1 and 2. FIG. 1 shows the configuration of an embodiment of the terminal 100 and FIG. 2 shows a system providing information to the terminal.

As shown in FIG. 1, the terminal 100 includes an input unit 110, a broadcasting module 120, a mobile communication module 130, a controller 140, a storage unit 150, and an output unit 160. The broadcasting module 120 and the mobile communication module 130 have separate antennas for seeking and receiving a broadcast signal and a wireless signal, respectively.

Two or more of the constituent elements 110, 120, 130, 140, 150 and 160 may be integrated into one constituent element or one of the constituent elements may be separated into two or more constituent elements. The present invention is applicable to any type of broadcast receivable terminal including a mobile phone, personal digital assistant (PDA), smart phone and notebook computer.

The input unit 110 receives an external input signal and generates corresponding data. The input unit 110 includes a key input unit 111 for receiving a key selection signal from a user of the terminal 100 and generating corresponding key data, a video input unit 113 for receiving an external video signal and generating corresponding video data and. an audio input unit 115 for receiving an external audio signal and generating corresponding audio data.

The key input unit 111 includes, for example, a keypad, touch pad and touch screen. The video input unit 113 includes a camera module for capturing a still image or moving image. The audio input unit 115 includes a microphone.

The broadcasting module 120 receives a broadcast signal and/or broadcast-related information from an external broadcast management server over a broadcast channel. The broadcasting module 120 receives broadcast signals using various broadcasting systems.

The broadcast management server may be a server that generates and transmits a broadcast signal and/or broadcast-related information. On the other hand, the broadcast management server may be a server that receives a previously generated broadcast signal and/or broadcast-related information and transmits it to the terminal.

The broadcast-related information may be information related to a broadcast channel, broadcast program or broadcasting service provider. On the other hand, the broadcast-related information may be provided over a mobile communication network and received by the mobile communication module 130.

The broadcast signal may include a television, a TV broadcast signal, radio broadcast signal, or data broadcast signal. The broadcast signal may also include a combination of a data broadcast signal and a TV broadcast signal or radio broadcast signal Specifically, the broadcasting module 120 may receive digital broadcast signals using digital broadcasting systems such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H) and Integrated Services Digital Broadcast-Terrestrial (ISDB-T). The broadcasting module 120 is configured to be suited to all broadcasting systems providing broadcast signals, as well as the above-mentioned digital broadcasting systems.

The mobile communication module 130 transmits and receives wireless signals to/from an external terminal and/or server implemented on the mobile communication network. The wireless signal may include various types of data based on a voice call connection, a video call connection or text/multimedia message transmission/reception as well as various data provided through a data communication system including wireless Internet or wireless local area network communication.

The controller 140 controls the entire operation of the terminal 100 and controls the constituent elements 110, 120, 130, 150 and 160 of the terminal such that they can be organically operated. Therefore, each of the constituent elements 110, 120, 130, 150 and 160 can perform its unique function and operation in response to a control signal generated by the controller 140.

The storage unit 150 stores all programs required to operate the terminal 100 as well as all data input to and output from the terminal. The storage unit 150 includes a storage medium of at least one of a flash memory type, hard disk type and multimedia card micro type. The terminal 100 may also manage Web storage on the Internet performing the function of the storage unit 150.

The output unit 160 outputs information related to the terminal 100 as a video signal or audio signal. The output unit 160 includes a video output unit 161 for outputting a video signal and an audio output unit 163 for outputting an audio signal.

The video output unit 161 includes at least one of a liquid crystal display, thin film transistor-liquid crystal display, organic light-emitting diode, flexible display and three-dimensional (3D) display. The audio output unit 163 includes a speaker.

In a first embodiment of the terminal 100, the controller 140 outputs selected information stored in the storage unit 150 through the output unit 160 upon sensing execution of a broadcast-related operation (described later). Alternatively, the controller 140 may output information through the output unit 160 from a broadcast management server 210 that is received in real time by the broadcasting module 120 or mobile communication module 130 upon sensing execution of the broadcast-related operation.

The controller 140 determines whether there is an amount of information that has not been output (referred to hereinafter as a 'non-output amount') upon sensing the completion of the broadcast-related operation. The controller 140 then continues to output the non-output amount through the output unit 160 or performs an output operation based on the completion of the broadcast-related operation if there is no non-output amount.

Specifically, the controller 140 may selectively perform the output operation based on the completion of the broadcast-related operation while outputting the non-output amount. Whether the output operation based on the completion of the broadcast-related operation is performed can be determined by the user of the terminal 100 or determined arbitrarily by the controller 140.

For example, the controller 140 suspends the output operation upon the completion of the broadcast-related operation while outputting the non-output amount when it is determined not to perform the output operation based on the completion of the broadcast-related operation and performs the output operation based on the completion of the broadcast-related operation when output of the non-output amount is completed. Alternatively, the controller 140 performs the output operation based on the completion of the broadcast-related operation while outputting the non-output amount when it is determined to perform the output operation based on the completion of the broadcast-related operation.

In a second embodiment of the terminal 100, the controller 140 controls the output unit 160 to display any one of one or more broadcast-related skins stored in the storage unit 150 while outputting the received broadcast signal upon sensing the reception of a broadcast signal by the broadcasting module 120. The displayed broadcast-related skin may be any one of a basic broadcast-related skin, a broadcast-related skin selected by the user, or a broadcast-related skin having conditions conforming to certain criteria. The displayed broadcast-related skin may also be selected before the reception of the broadcast signal or during the output of the broadcast signal.

Figure 3:
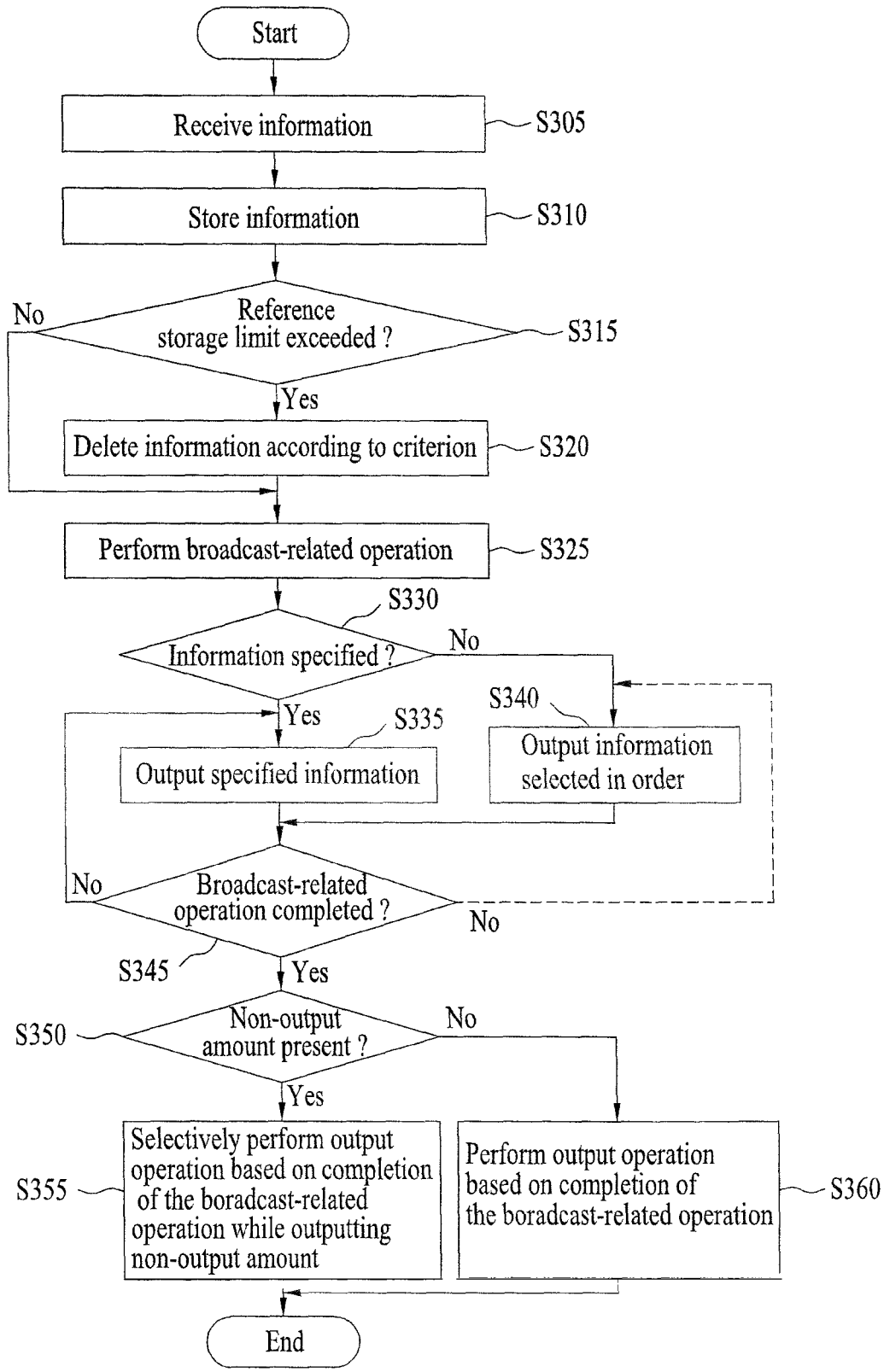
FIG. 3 is a flowchart illustrating an embodiment of an information output process of the terminal according to the present invention.

An information output method of the terminal 100 according to the present invention will be described in detail with reference to FIGS. 1 to 3. FIG. 3 is a flowchart illustrating an embodiment of the information output method of the terminal 100 according to the present invention. As shown in FIG. 3, the terminal 100 receives information for output during a broadcast-related operation via the broadcasting module 120 or mobile communication module 130 (S305).

The broadcast-related operation refers to a preliminary operation required to perform the reception and output of a broadcast signal. For example, the broadcast-related operation may include at least one of a broadcast channel entry operation, a broadcast channel change operation, a broadcast channel search operation, a broadcast signal scan operation based on broadcast interruption during broadcast watching, or a broadcast channel/program purchase wait operation.

It should be noted that the broadcast-related operation is not limited to the above-mentioned operations. The broadcast related operation can include any operation capable of generating a wait time in a broadcast mode.

The information refers to information that is provided from an external broadcast management server such that it is output through the terminal 100 during the broadcast-related operation. For example, the information may include advertisement media, or movie/music disc public relation media, or broadcast channel/broadcast program/broadcasting service provider public relation media.

The terminal 100 may receive information provided over a broadcasting network and mobile communication network. The information is received from the broadcast management server 210 using, respectively, the broadcasting module 120 and mobile communication module 130.

For example, the information provided over the broadcasting network may be received over a broadcast channel currently providing a broadcast signal to the terminal 100, a different broadcast channel or a data channel established in the terminal. This information may also be received in a form contained in an electronic program guide (EPG) of DMB or an electronic service guide (ESG) of DVB-H. The information provided over the mobile communication network is received using a data communication system such as wide broadband (WiBro), WiMax, WiFi, wireless LAN, high speed download packet access (HSDPA), or wide code division multiple access (WCDMA).

The information is received (S305) when new information is updated in the broadcast management server 210, when the terminal 100 requests information of the broadcast management server through the mobile communication module 130, and/or when the broadcast management server requests that the terminal receive information. The terminal 100 can periodically or randomly check whether new information has been updated in the broadcast management server 210. Alternatively, the broadcast management server 210 may notify the terminal 100 when new information is updated.

The information may also be received (S305) at regular time intervals or at random. The terminal 100 or broadcast management server 210 can specify the time interval. Specifically, the terminal 100 can arbitrarily determine the time interval or a user of the terminal can specify the time interval.

The storage unit 150 stores the information received via the broadcasting module 120 or the mobile communication module 130 (S310). The storage unit 150 can classify and store the received information according to a certain criterion in response to a control signal from the controller 140. Alternatively, the received information may be classified according to the certain criterion according to the user's request.

The received information contains conditions for classification according to the certain criterion. The broadcast management server 210 can set the certain criteria.

For example, the storage unit 150 may classify and store the received information according to at least one of a broadcast-related operation criterion, a broadcast channel criterion, a broadcast program criterion, a broadcasting service provider criterion, or a time criterion and place criterion in response to the control signal from the controller 140. The broadcasting service provider refers to an entity that creates a broadcast program to be provided to a terminal 100 belonging to the broadcasting network or provides the created broadcast program. The broadcasting service provider manages at least one broadcast channel and may manage the broadcast channel independent of other broadcasting service providers.

The information stored in the storage unit 150 has a certain associated output amount. The output amount may be set by the broadcast management server 210 or the terminal 100.

For example, a time of 30 seconds or some portion thereof can be set as the output amount when the output amount is set based on an output time and the information has a total corresponding time of 30 seconds. Alternatively, a total of 300 frames or some portion thereof may be set as the output amount when the output amount is set based on output frames and the information has a total of 300 frames. Specifically, only a highlight portion of the information may be set as the output amount when only a portion of the information is set as the output amount or the output amount may be set such that the information is divided into a plurality of parts and output in a series fashion.

The controller 140 determines whether the amount of the information stored in the storage unit 150 exceeds a reference storage limit (S315). The reference storage limit refers to a storage limit of information that may be stored in the storage unit 150 in consideration of the entire capacity of the storage unit 150. The reference storage limit can be determined arbitrarily by the terminal 100 or according to a user's selection.

For example, the reference storage limit may be set according to the number or capacity of information. If "information 10" or "information 100 KB" is set as the reference storage limit, the controller 140 determines whether the amount of information stored in the storage unit 150 exceeds 10 or the capacity of the information stored in the storage unit 150 exceeds 100 KB.

The controller 140 deletes at least a portion of information from among the information stored in the storage unit 150 according to a certain criterion (S320) when the amount of information stored in the storage unit 150 exceeds the reference storage limit. The criterion includes at least one of the order of storage, the user's selection, the frequency of use, whether an information output period has expired, and whether the number of information outputs has expired.

For example, the controller 140 can delete at least a portion of the information stored in the storage unit 150 in the order of earlier storage, in the order of lower frequency of use, in the order of earlier information output period expiration, or in the order of earlier information output number expiration. Alternatively, the controller 140 may display a list through the video output unit 161 of the information stored in the storage unit 150 and delete information selected from the information list by the user.

The controller 140 may also display a text message through the video output unit 161 notifying the user that an information deletion operation must be executed before deleting the information (S320). The controller 140 deletes the information (S320) only when the user selects the information deletion operation.

The controller 140 performs the broadcast-related operation automatically or according to the user's selection (S325). The broadcast-related operation is the same as previously described. Therefore, a detailed description will be omitted.

The controller 140 determines whether there is information specified that corresponds to the broadcast-related operation (S330). The specified information may include information specified for the broadcast-related operation. The specified information may also be information specified for a specific broadcast channel, a broadcast program currently provided over the specific broadcast channel, or a broadcasting service provider managing the specific broadcast channel when the broadcast-related operation is an entry or change to the specific broadcast channel.

Alternatively, the specified information may include information specified for a broadcast channel currently being watched, a broadcast program currently provided over the broadcast channel or a broadcasting service provider managing the broadcast channel when the broadcast-related operation is a broadcast signal scan operation. As another alternative, the specified information may include information specified for a broadcast channel to be purchased, a broadcast program to be purchased, or a broadcasting service provider providing the broadcast channel or broadcast program when the broadcast-related operation is a broadcast channel or program purchase wait operation.

The output unit 160 outputs the specified information (S335) when it is determined that there is information specified with respect to the broadcast-related operation. For example, the output unit 160 may output the specified information in order when a plurality of information is specified with respect to the broadcast-related operation.

On the other hand, the output unit 160 outputs information selected from the storage unit 150 in order (S340) when it is determined that there is no information specified with respect to the broadcast-related operation. For example, the output unit 160 may output a plurality of information at least once, the information selected from the storage unit 150 in order or output information selected from the storage unit 150.

The user may specify the amount of information for output during the broadcast-related operation or the number of times to output information during the broadcast-related operation. The certain order may include at least one of a cyclic order, an order specified by the user, the order of later storage, or a random order.

The information may be information stored in the storage unit 150 or information received in real time over the broadcasting network or mobile communication network by the broadcasting module 120 or mobile communication module 130. For example, the output unit 160 may output a certain amount of the entire information received earlier in real time and then subsequently output the remaining amount of information received while outputting the certain amount of information.

The controller 140 determines whether the broadcast-related operation has been completed (S345). The controller 140 continues outputting the information (S335 or S340) upon determining that the broadcast-related operation has not been completed if all the information has been output. The output unit 160 may output the information repeatedly if all the information has been output.

The controller 140 determines whether there is an amount of information, or a 'non-output amount', that has not been output (S350) upon completion of the broadcast-related operation. The output unit 160 selectively performs an output operation upon the completion of the broadcast-related operation while continuing to output the non-output amount (S355) when there is a non-output amount. On the other hand, the output unit 160 performs the output operation based on the completion of the broadcast-related operation (S360) when it is determined that there is no non-output amount.

The output unit 160 may output the non-output amount when the non-output amount output operation is selected by the user or is specified as a default in the terminal 100. Alternatively, the output unit 160 may output the non-output amount when the information being output at step S335 or S340 is information previously output less than a predetermined number of times.

The output unit 160 can perform the output operation based on the completion of the broadcast-related operation while continuing to output the non-output amount when selected by the user or specified as a default in the terminal 100. For example, the output unit 160 and, specifically, the video output unit 161, may output a video signal upon the completion of the broadcast-related operation while outputting a video signal of the non-output amount by using at least one of a screen division mode, an overlay mode, a Picture In Picture (PIP) mode, a pop-up mode and an On Screen Display (OSD) mode.

Alternatively, the output unit 160 may output a video signal through the video output unit 161 upon completion of the broadcast-related operation while outputting an audio signal of the non-output amount through the audio output unit 163. Furthermore, the output unit 160 may output an audio signal through the audio output unit 163 upon completion of the broadcast-related operation while outputting a video signal of the non-output amount through the video output unit 161. Moreover, the output unit 160 may perform the output operation upon completion of the broadcast-related operation while displaying the non-output amount on a portion of the screen in a text format.

Figure 4:
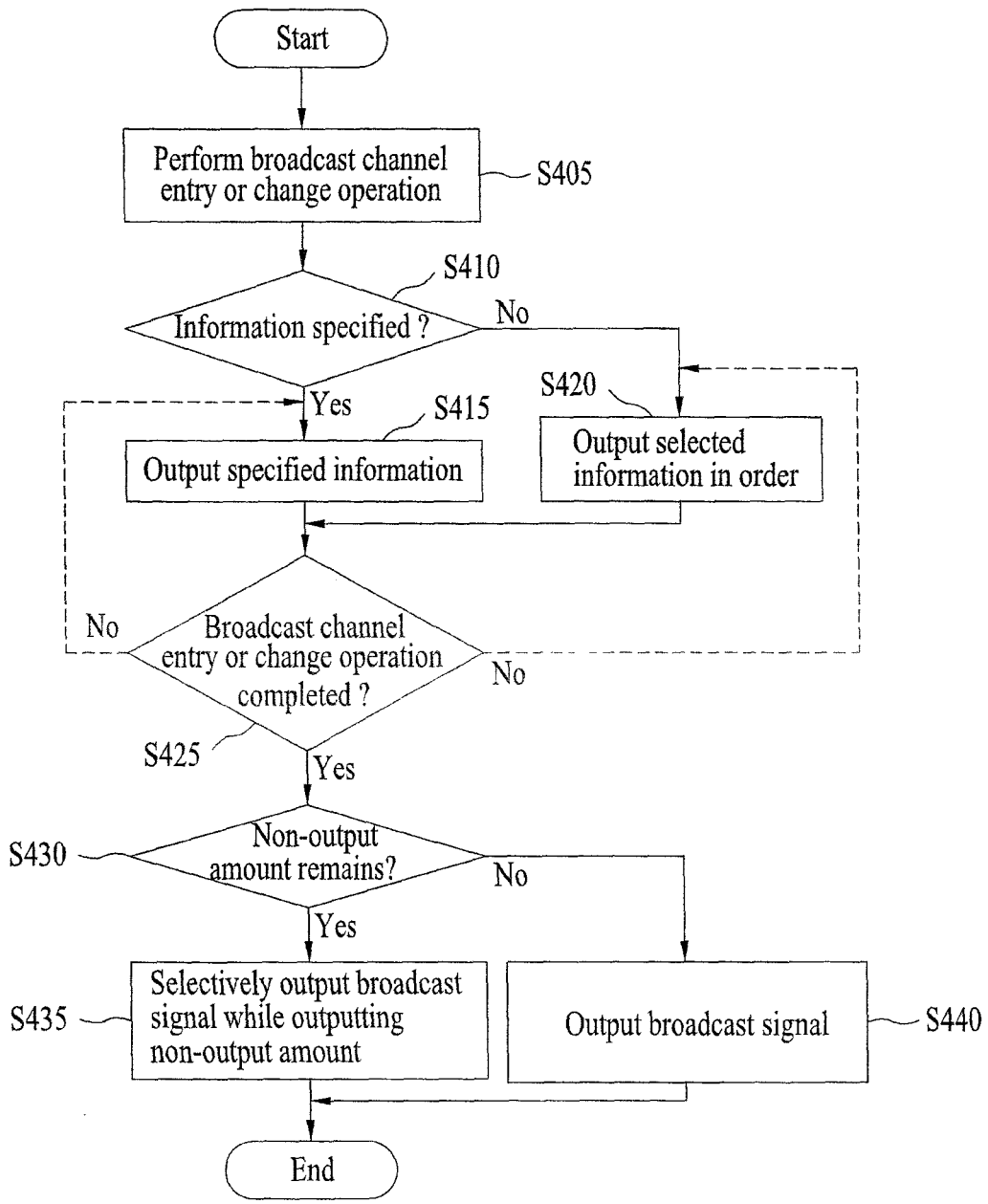
FIG. 4 is a flowchart illustrating the embodiment of the information output process of the terminal according to the present invention when a broadcast-related operation is a broadcast channel entry/change operation.

A detailed description will be given with reference to FIGS. 1, 2 and 4 of the information output process of the terminal 100 according to the present invention when the broadcast-related operation is the broadcast channel entry/change operation FIG. 4 is a flowchart illustrating an information output method of the terminal 100 according to the present invention.

As shown in FIG. 4, the broadcasting module 120 performs the broadcast channel entry operation or broadcast channel change operation (S405). The broadcast channel entry operation can be performed automatically when the user selects a broadcast output mode and the broadcast channel change operation can be performed when the user selects a different broadcast channel during use of a broadcast channel.

The controller 140 determines whether entry or change is indicated for a broadcast channel, a broadcast program currently provided over the broadcast channel, or a broadcasting service provider managing the broadcast channel (S410). The output unit 160 outputs the specified information (S415) when there is information specified. On the other hand, the output unit 160 outputs information selected from the storage unit 150 in a certain order (S420) when there is no information specified.

The controller 140 determines whether the broadcast channel entry operation or broadcast channel change operation has been completed (S425). The output unit 160 continues performing the information output operation as previously determined if the broadcast channel entry operation or broadcast channel change operation has not been completed. On the other hand, the controller 140 determines whether there is a non-output amount remaining of the information being output (S430) when it is determined that the broadcast channel entry operation or broadcast channel change operation has been completed.

The output unit 160 selectively outputs a broadcast signal provided from the entered or changed broadcast channel upon the completion of the broadcast channel entry or change operation while continuing to output the non-output amount (S435) when it is determined that there is a non-output amount. The output unit 160 outputs the broadcast signal provided from the entered or changed broadcast channel (S440) if there is no non-output amount. Outputting the non-output amount and selectively outputting the broadcast signal can be performed upon user selection or according to a default set in the terminal 100.

The output unit 160 may output a video signal constituting the broadcast signal while outputting a video signal of the non-output amount using at least one of a screen division mode, an overlay mode, a PIP mode, a pop-up mode or an OSD mode. Alternatively, the output unit 160 may output a video signal constituting the broadcast signal while outputting an audio signal of the non-output amount or output an audio signal constituting the broadcast signal while outputting a video signal of the non-output amount. As another alternative, the output unit 160 may output the broadcast signal while outputting the non-output amount onto a portion of the screen in a text format or output the non-output amount while outputting the broadcast signal onto a portion of the screen in a text format.

A detailed description will be given with reference to FIGS. 5A to 5G of a process for outputting information onto the screen when the broadcast-related operation is the broadcast channel entry operation. FIGS. 5A to 5G are state diagrams illustrating a process for outputting information onto the screen when the terminal 100 enters a specific broadcast channel.

Figure 5A:
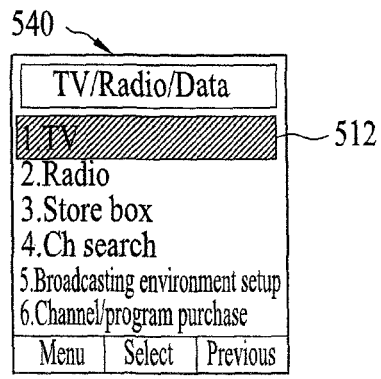
FIGS. 5A to 5G are state diagrams illustrating an embodiment of a process of outputting information on a screen according to the present invention when the broadcast-related operation is a broadcast channel entry operation.

A list of a plurality of menu items indicative of broadcast-related functions is displayed on the screen 510 when the terminal 100 enters the broadcast mode, as illustrated in FIG. 5A. The terminal 100 outputs specific information on the screen 540 while performing an operation to enter a broadcast channel providing a TV broadcast program when "TV" 512, which is indicative of a TV watch function, is selected from the list, as illustrated in FIG. 5B.

Figure 5B:
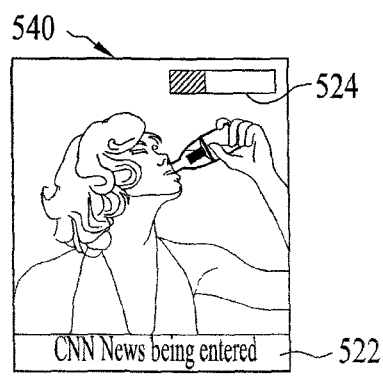

As illustrated in FIG. 5B, the terminal 100 can display a text message indicating that a specific broadcast channel is being currently entered, such as "CNN News being entered" 522. The text message may be displayed on a portion of the screen 540.

The terminal 100 can also display an indicator indicating a portion of the information that has been output so far. The indicator may be a progression bar 524 that is displayed on a portion of the screen 540, such as an upper right portion.

The information illustrated in FIG. 5B may include information specified for the broadcast channel entry operation, information specified for a broadcast channel to be entered, information specified for a broadcast program currently provided over the broadcast channel to be entered, or information specified for a broadcasting service provider managing the broadcast channel to be entered. The information illustrated in FIG. 5B may also be information prestored in the terminal 100 or information received in real time from the external broadcast management server 210.

For example, the information illustrated in FIG. 5B may include advertisement media, movie or music disc public relation media, broadcast channel programming information or information of programs, broadcast program contents information or highlight information, broadcast time information or preview image information, or various multimedia information specified by a broadcasting service provider.

The terminal 100 outputs a broadcast signal provided from the entered broadcast channel, such as "CNN News" (5C), when the broadcast channel entry operation is completed and all the information illustrated in FIG. 5B has been output. On the other hand, the terminal 100 outputs the remaining non-output amount via one of various methods if the broadcast channel entry operation has been completed and a non-output amount remains from the information illustrated in FIG. 5B.

Figure 5C:
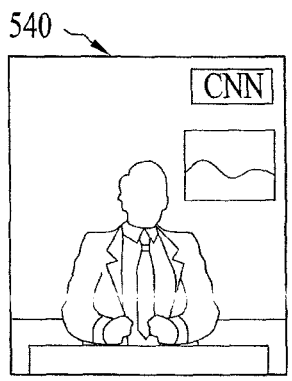
Figure 5D:
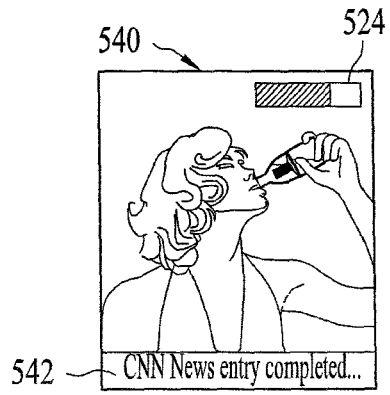

According to a first method illustrated in FIG. 5D, the terminal 100 displays a text message 542 on a portion of the screen 540 indicating that entry to the specific broadcast channel has been completed while outputting the non-output amount on the screen. As illustrated in FIG. 5D, an indication 542 that entry to "CNN News" has been completed is displayed on a bottom portion of the screen 540.

Figure 5E:
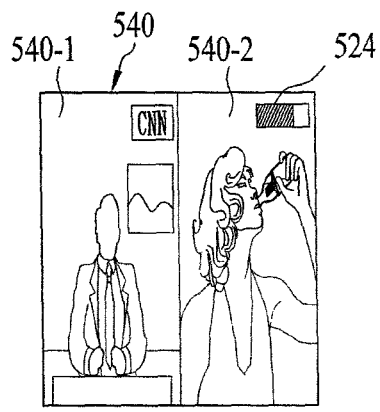

According to a second method illustrated in FIG. 5E, the terminal 100 divides the screen 540 into a plurality of areas 540-1 and 540-2. The broadcast signal provided from the entered broadcast channel, such as "CNN News", is output the first area 540-1 and the non-output amount is output in the second area 540-2.

Figure 5F:

According to a third method illustrated in FIG. 5F, the terminal 100 outputs an audio signal of the broadcast signal provided from the entered broadcast channel on a portion of the screen 540 in text format 562 while outputting the non-output amount on the screen 540. As illustrated in FIG. 5F, the audio signal of "CNN News" is provided on a bottom portion of the screen 540 in text format 562.

Figure 5G:
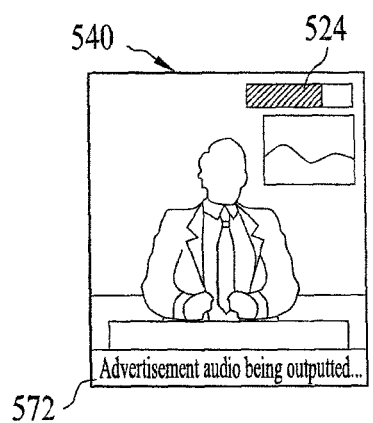

According to a fourth method illustrated in FIG. 5G, the terminal 100 outputs an audio signal of the non-output amount on a portion of the screen 540 in text format 572 while outputting the broadcast signal provided from the entered broadcast channel. As illustrated in FIG. 5G, the audio signal of the non-output amount is provided on a bottom portion of the screen 540 in text format 572 while outputting "CNN News".

The terminal 100 can output the broadcast signal provided from the entered broadcast channel, such as "CNN News" illustrated in FIG. 5C, when the non-output amount output operation is completed. The non-output amount output operation may have been performed via any one of the methods illustrated in FIGS. 5D through 5G.

A detailed description will be given with reference to FIGS. 6A to 6G of a process for outputting information onto the screen when the broadcast-related operation is the broadcast channel change operation. FIGS. 6A to 6G are state diagrams illustrating a process of outputting information onto the screen when the terminal 100 changes a current broadcast channel to a specific broadcast channel.

Figure 6A:
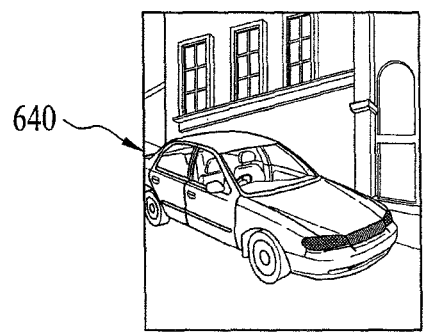
FIGS. 6A to 6G are state diagrams illustrating an embodiment of a process of outputting information on a screen according to the present invention when the broadcast-related operation is the broadcast channel change operation.

The terminal 100 receives a broadcast channel change signal from the user while outputting a broadcast signal provided from the current broadcast channel on the screen 640 as illustrated in FIG. 6A. The broadcast channel change signal refers to a selection signal for broadcast channels other than the broadcast channel providing the broadcast signal currently being output.

Figure 6B:

The terminal 100 outputs specific information on the screen 640 while changing the current broadcast channel to a specific broadcast channel corresponding to the broadcast channel change signal upon receiving the broadcast channel change signal, as illustrated in FIG. 6B. As illustrated in FIG. 6B, the terminal 100 displays a text message 622 on a portion of the screen 640 indicating that the current broadcast channel is currently being changed to the specific broadcast channel.

FIG. 6B illustrates "being changed to CNN News" 622 displayed on a bottom portion of the screen 640 indicating an amount of the output amount of the information that has been output so far. As illustrated in FIG. 6B, a progressive bar 624 is displayed on an upper right portion of the screen 640.

The information illustrated in FIG. 6B may include information specified for the broadcast channel change operation, information specified for a broadcast channel to be changed, information specified for a broadcast program currently provided over the broadcast channel to be changed, or information specified for a broadcasting service provider managing the broadcast channel to be changed. The information illustrated in FIG. 6B may also be information prestored in the terminal 100 or information received in real time from the external broadcast management server 210.

Figure 6C:
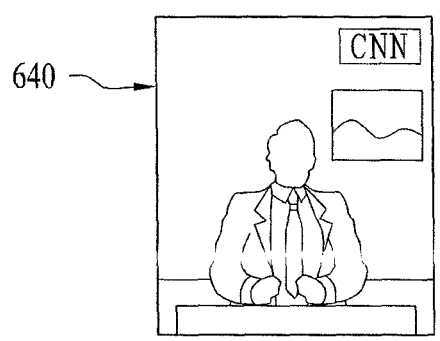

The terminal 100 outputs a broadcast signal provided from the changed broadcast channel, such as "CNN News," as illustrated in FIG. 6C, when the broadcast channel change operation is completed and all the information illustrated in FIG. 6B has been output. On the other hand, the terminal 100 outputs the non-output amount via one of various methods when the broadcast channel change operation is completed and a non-output amount remains of the information illustrated in FIG. 6B.

Figure 6D:
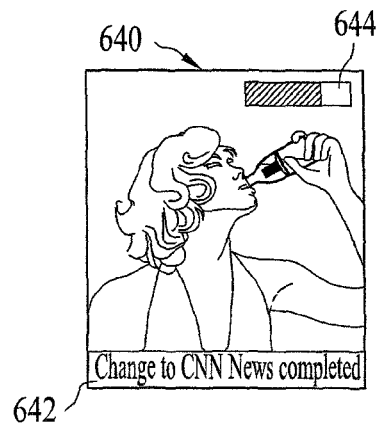

A first method is illustrated in FIG. 6D. The terminal 100 displays a text message 642 on a bottom portion of the screen 640 indicating that the change to the specific broadcast channel, such as "CNN News" has been completed while outputting the non-output amount on the screen.

Figure 6E:
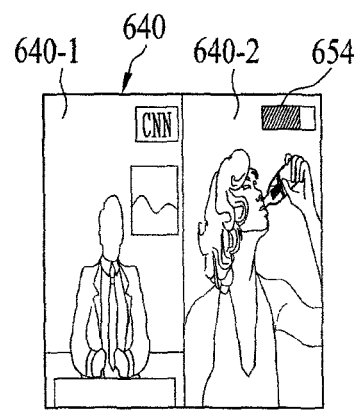

A second method is illustrated in FIG. 6E. The terminal 100 divides the screen 640 into a plurality of areas and outputs the broadcast signal provided from the changed broadcast channel, such as "CNN News" in the first area 640-1 and the non-output amount in the second area 640-2.

Figure 6F:
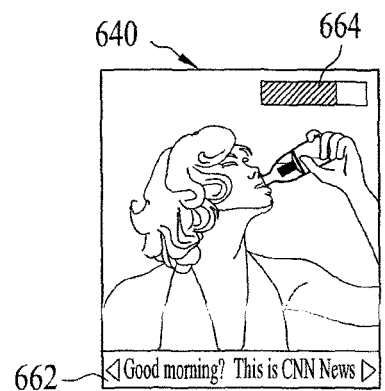

A third method is illustrated in FIG. 6F. The terminal 100 outputs an audio signal of the broadcast signal provided from the changed broadcast channel, such as "CNN News", on a bottom portion of the screen 640 in a text format 662 while outputting the non-output amount on the screen.

Figure 6G:
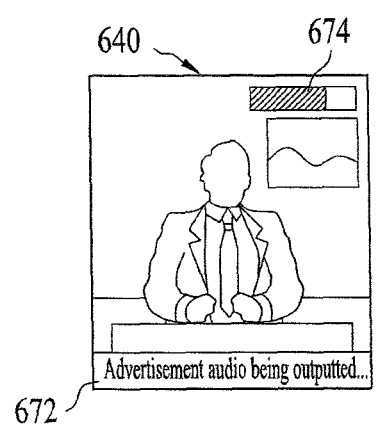

A fourth method is illustrated in FIG. 6G. The terminal 100 outputs an audio signal of the non-output amount onto a bottom portion of the screen 640 in a text format 672 while outputting the broadcast signal provided from the changed broadcast channel, such as "CNN News", on the screen 640.

The terminal 100 can output the broadcast signal provided from the changed broadcast channel, such as "CNN News", as illustrated in 6C, when the non-output amount output operation is completed. The output amount output operation may have been performed via any one of the methods illustrated in FIGS. 6D, 6E, 6F and 6G.

A detailed description will be given with reference to FIGS. 7A to 7G of a process for outputting information on the screen when the broadcast-related operation is the broadcast channel search operation. FIGS. 7A to 7G are state diagrams illustrating a process of outputting information onto the screen when the terminal 100 searches for broadcast channels.

Figure 7A:
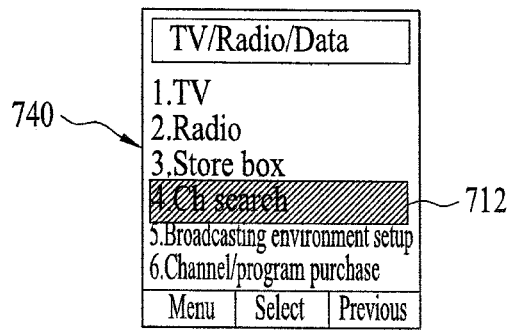
FIGS. 7A to 7G are state diagrams illustrating an embodiment of a process of outputting information on a screen according to the present invention when the broadcast-related operation is a broadcast channel search operation.
Figure 7B:

The terminal 100 displays a list of a plurality of menu items indicative of broadcast-related functions on the screen 740 upon entering the broadcast mode, as illustrated in FIG. 7A. As illustrated in FIG. 7B, terminal 100 outputs specific information on the screen 740 while searching for currently available broadcast channels when "ch search" 712, which is indicative of a broadcast channel search function, is selected from the list.

As illustrated in FIG. 7B, the terminal 100 displays a text message 722 on a bottom portion of the screen 740 indicating that broadcast channels are currently being searched for. The terminal 100 also displays an indicator 724 on a portion of the screen 740 indicating an amount of the information output so far.

Figure 7C:
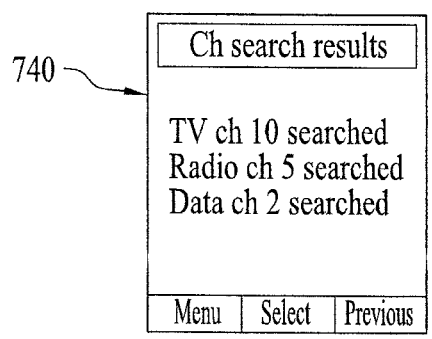

The terminal 100 outputs broadcast channel search results on the screen 740 when the broadcast channel search operation is completed and all the information illustrated in FIG. 7B has been output, as illustrated in FIG. 7C. Alternatively, the terminal 100 outputs the non-output amount via one of various methods when the broadcast channel search operation is completed and a non-output amount remains of the information illustrated in FIG. 7B.

Figure 7D:
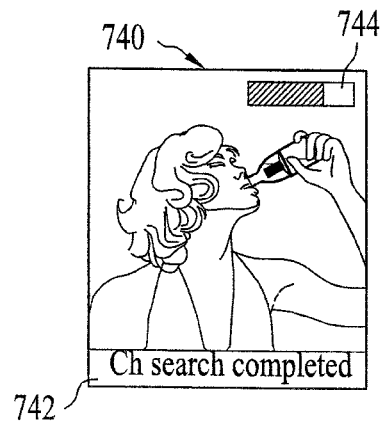

A first method is illustrated in FIG. 7D. The terminal 100 displays a text message 742 on a bottom portion of the screen 740 indicating that the broadcast channel search operation has been completed while outputting the non-output amount on the screen 740.

Figure 7E:
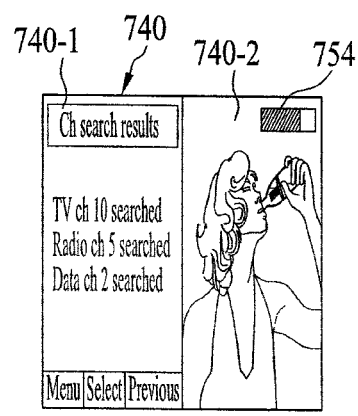

A second method is illustrated in FIG. 7E. The terminal 100 divides the screen 740 into a plurality of areas and outputs the broadcast channel search results in the first area 740-1 and the non-output amount in the second area 740-2.

Figure 7F:
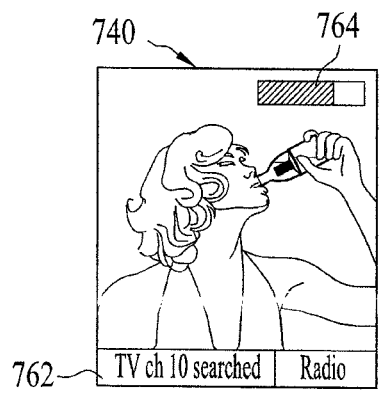

A third method is illustrated in FIG. 7F. The terminal 100 outputs the broadcast channel search results on a bottom portion of the screen 740 in a ticker mode 762 while outputting the non-output amount on the screen.

Figure 7G:
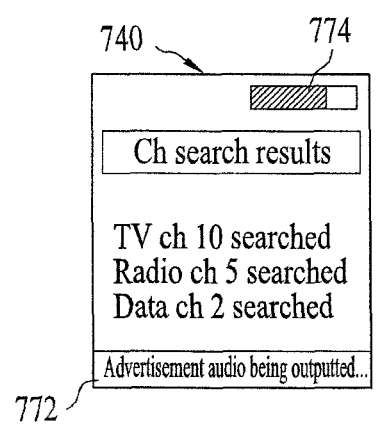

A fourth method is illustrated in FIG. 7G. The terminal 100 outputs an audio signal of the non-output amount on a bottom portion of the screen 740 in a text format 772 while outputting the broadcast channel search results on the screen 740.

The terminal 100 can output the broadcast channel search results, as illustrated in FIG. 7C, when the non-output amount output operation is completed. The non-output amount output operation may have been performed via any one of the methods illustrated in FIGS. 7D, 7E, 7F and 7G.

A detailed description will be given with reference to FIGS. 8A to 8G of a process for outputting information on the screen when the broadcast-related operation is the broadcast signal scan operation. FIGS. 8A to 8G are state diagrams illustrating a process of outputting information on the screen when the terminal 100 scans a broadcast signal due to broadcast interruption while viewing a broadcast.

Figure 8A:
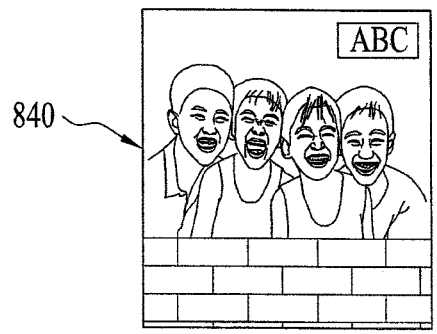
FIGS. 8A to 8G are state diagrams illustrating an embodiment of a process of outputting information on a screen according to the present invention when the broadcast-related operation is a broadcast signal scan operation.

The terminal 100 may fail to output the broadcast signal due to poor sensitivity of the broadcast signal while outputting a broadcast signal provided from a specific broadcast channel on the screen 840, as illustrated in FIG. 8A. The terminal 100 will output specific information on the screen 840 while scanning the broadcast signal from the specific broadcast channel in order to continue performing the broadcast signal output operation, as illustrated in FIG. 8B.

Figure 8B:
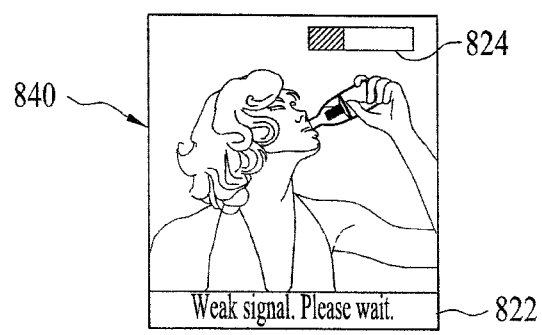

As illustrated in FIG. 8B, the terminal 100 displays a text message 822 on a bottom portion of the screen 840 indicating that the broadcast signal cannot currently be output due to poor sensitivity of the broadcast signal. The terminal 100 also displays an indicator 824 on a portion of the screen 840 indicating an amount of the information output so far. The information illustrated in FIG. 8B may include information specified for the broadcast signal scan operation, information specified for the specific broadcast channel, information specified for a broadcast program provided over the specific broadcast channel, or information specified for a broadcasting service provider managing the specific broadcast channel.

Figure 8C:
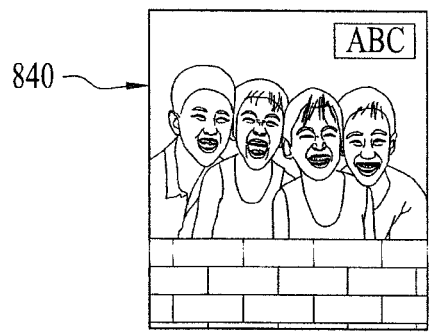

The terminal 100 outputs the broadcast signal provided from the specific broadcast channel on the screen 840, as illustrated in FIG. 8C, when the broadcast signal scan operation is completed and all the information illustrated in FIG. 8B has been output. Alternatively, the terminal 100 outputs the non-output amount via one of various methods if the broadcast signal scan operation is completed and a non-output amount remains of the information illustrated in FIG. 8B.

Figure 8D:
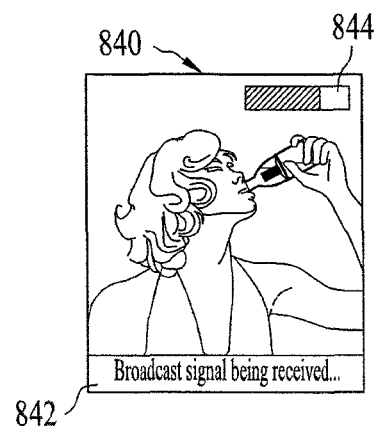

A first method is illustrated in FIG. 8D. The terminal 100 displays a text message 842 on a bottom portion of the screen 840 indicating that the broadcast signal from the specific broadcast channel is currently being received while outputting the non-output amount onto the screen 840.

Figure 8E:
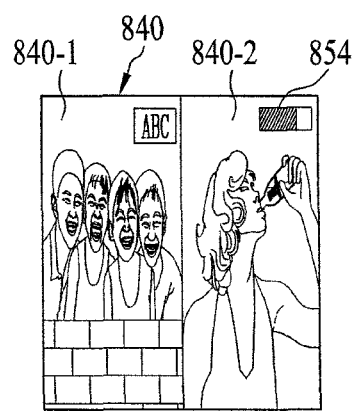

A second method is illustrated in FIG. 8E. The terminal 100 divides the screen 840 into a plurality of areas and outputs the broadcast signal provided from the specific broadcast channel in the first area 840-1 and the non-output amount in the second area 840-2.

Figure 8F:
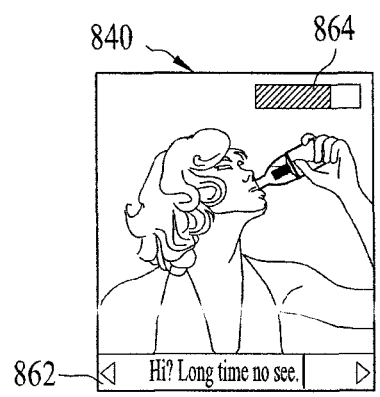

A third method illustrated in FIG. 8F. The terminal 100 outputs an audio signal of the broadcast signal provided from the specific broadcast channel on a bottom portion of the screen 840 in a text format 862 while outputting the non-output amount on the screen.

Figure 8G:
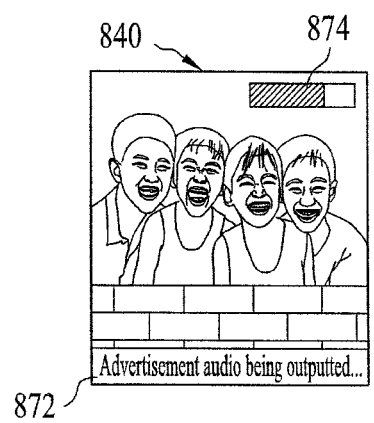

A fourth method is illustrated in FIG. 8G. The terminal 100 outputs an audio signal of the non-output amount on a bottom portion of the screen 840 in a text format 872 while outputting the broadcast signal provided from the specific broadcast channel on the screen 840.

The terminal 100 can output the broadcast signal provided from the specific broadcast channel, as illustrated in FIG. 8C, when the non-output amount output operation is completed. The non-output amount output operation may have been performed via any one of the methods illustrated in FIGS. 8D, 8E, 8F and 8G.

A detailed description will be given with reference to FIGS. 9A to 9G of a process for outputting information onto the screen when the broadcast-related operation is the broadcast channel/program purchase wait operation. FIGS. 9A to 9G are state diagrams illustrating a process of outputting information the screen when the terminal 100 performs the broadcast channel or program purchase wait operation.

Figure 9A:
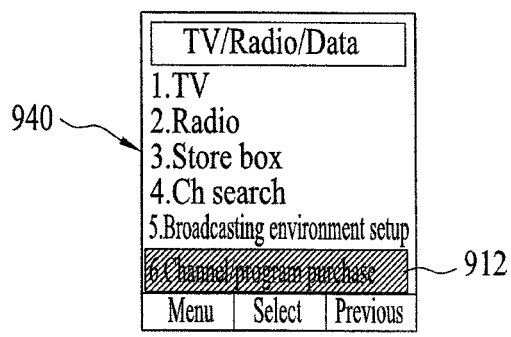
FIGS. 9A to 9G are state diagrams illustrating an embodiment of a process of outputting information on a screen according to the present invention when the broadcast-related operation is a broadcast channel/program purchase wait operation.
Figure 9B:
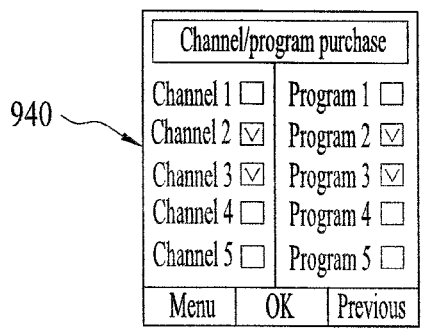

The terminal 100 displays a list of a plurality of menu items indicative of broadcast-related functions on the screen 940 upon entering the broadcast mode, as illustrated in FIG. 9A. The terminal 100 displays a list of purchasable broadcast channels and/or a list of purchasable broadcast programs on the screen 940, as illustrated in FIG. 9B, when "Channel/Program Purchase" 912, which is indicative of a broadcast channel/program purchase function, is selected from the list.

Figure 9C:
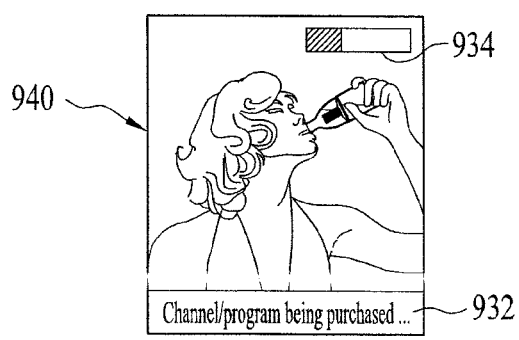

The terminal 100 outputs specific information on the screen 940 while waiting to purchase the selected broadcast channel or program, as illustrated in FIG. 9C, when at least one broadcast channel and/or broadcast program is selected from the list. As illustrated in FIG. 9C, the terminal 100 displays a text message 932 on a bottom portion of the screen 940 indicating that the broadcast channel or program is currently being purchased. The terminal 100 also displays an indicator 934 on a portion of the screen 940 indicating an amount of the information output so far.

The information illustrated in FIG. 9C may include information specified for the broadcast channel or program purchase wait operation. The information may be pre-stored in the terminal 100 or received in real time from the external broadcast management server 210.

Figure 9D:
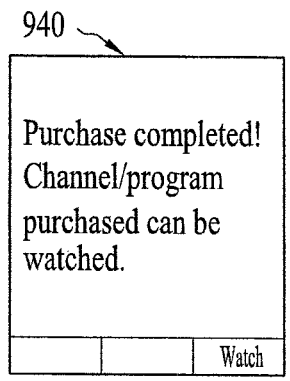

The terminal 100 outputs a text message on the screen 940 indicating that the broadcast channel or program purchase has been completed, as illustrated in FIG. 9D, when the broadcast channel or program purchase operation is completed and all the information illustrated in FIG. 9C has been output. Alternatively, the terminal 100 can output the non-output amount via one of various methods when the broadcast channel or program purchase operation is completed and a non-output amount is remaining of the information illustrated in FIG. 9C.

Figure 9E:
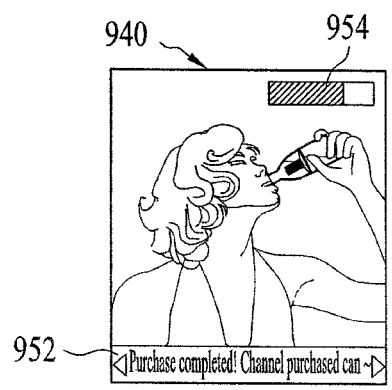

A first method is illustrated in FIG. 9E. The terminal 100 displays a text message 952 on a bottom portion of the screen 940 indicating that the broadcast channel or program purchase has been completed while outputting the non-output amount on the screen.

Figure 9F:
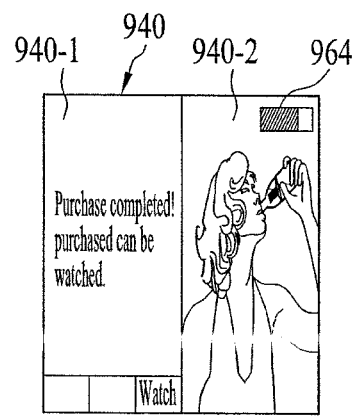

A second method is illustrated in FIG. 9F. The terminal 100 divides the screen 940 into a plurality of areas and outputs the text message indicating that the broadcast channel or program purchase has been completed in the first area 940-1 and the non-output amount in the second area 940-2.

Figure 9G:
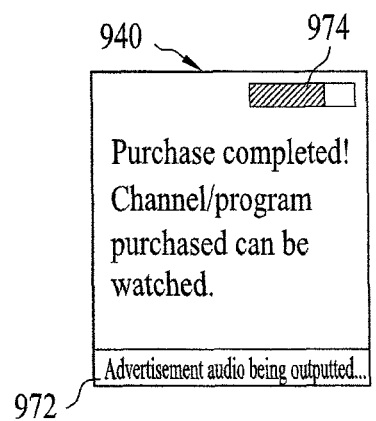

A third method is illustrated in FIG. 9G. The terminal 100 outputs an audio signal of the non-output amount on a bottom portion of the screen 940 in a text format 972 while outputting the text message indicating that the broadcast channel or program purchase has been completed on the screen.

The terminal 100 can output the text message indicating that the broadcast channel or program purchase has been completed, as illustrated in FIG. 9D, when the non-output amount output operation is completed. The non-output amount output operation may have been performed via any one of the methods illustrated in FIGS. 9E, 9F and 9G.

Figure 10:
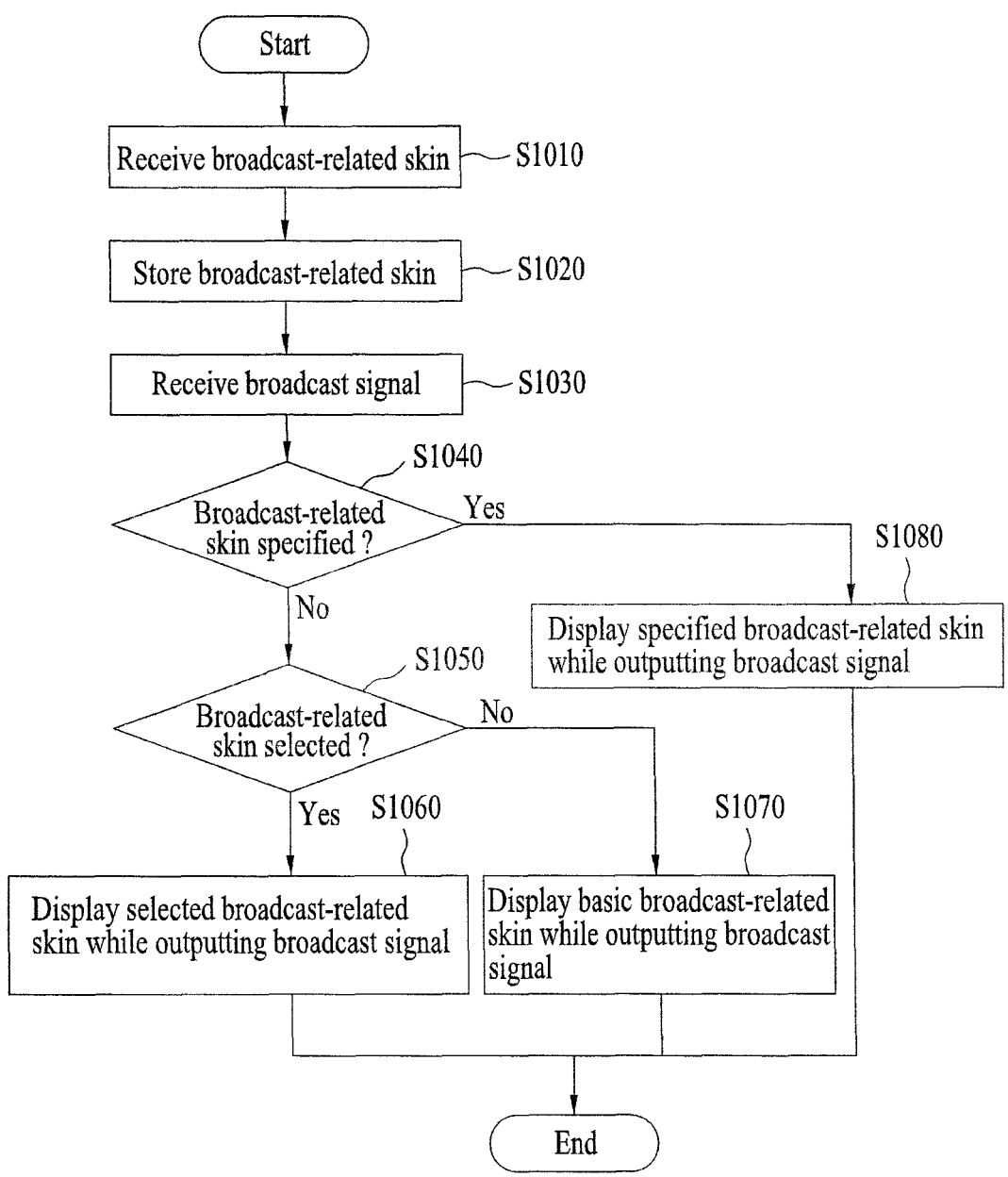
FIG. 10 is a flowchart illustrating another embodiment of the information output process of the terminal according to the present invention.

Another information output process of the terminal 100 according to the present invention will be described in detail with reference to FIGS. 1, 2 and 10. FIG. 10 is a flowchart illustrating another information output method according to the present invention.

As shown in FIG. 10, the terminal 100 receives via the broadcasting module 120 or mobile communication module 130 a broadcast-related skin for display during broadcast output (S1010). The broadcast-related skin refers to a background image that is related to the broadcast output.

The broadcast-related skin may include one or more function keys for input of command signals to execute functions, such as a broadcast channel change, a volume adjustment, or a broadcast information search. The broadcast-related skin may be output in audio form as well as in image form.

The terminal 100 may receive broadcast-related skins provided over the broadcasting network and mobile communication network from the broadcast management server 210 using, respectively, the broadcasting module 120 and mobile communication module 130. The broadcast-related skin provided over the mobile communication network is received using a data communication system, such as WiBro, WiMax, WiFi, wireless LAN, HSDPA, or WCDMA, etc.

For example, the broadcast-related skin provided over the broadcasting network may be received over either a broadcast channel currently providing a broadcast signal to the terminal 100, a different broadcast channel, or a data channel set in the terminal 100. This broadcast-related skin may be also received in a form contained in an EPG of DMB or an ESG of DVB-H.

The broadcast-related skin is generally received when the terminal 100 requests a broadcast-related skin from the broadcast management server 210 via the mobile communication module 130 (S1010). Alternatively, the broadcast-related skin may be received when the broadcast management server 210 instructs the terminal 100 to receive a broadcast-related skin (S1010).

The storage unit 150 stores the received broadcast-related skin (S1020). The storage unit 150 can classify and store the received broadcast-related skin according to a certain criterion in response to a control signal from the controller 140 if the received broadcast-related skin contains conditions for classification according to the criterion. Alternatively, the received broadcast-related skin may be classified according to criterion specified by the user. For example, the storage unit 150 may classify and store the received broadcast-related skin according to at least one of a broadcast channel criterion, a broadcast program criterion, a time criterion or a place criterion in response to a control signal from the controller 140.

The terminal 100 receives a broadcast signal provided from a specific broadcast channel via the broadcasting module 120 (S1030). The terminal 100 may also receive a broadcast-related skin in real time over the broadcasting network or mobile communication network while receiving the broadcast signal. The terminal 100 may display an indicator on the screen, such as "in reception/reception completed", corresponding to the real-time reception of the broadcast-related skin via the video output unit 161.

The controller 140 then determines whether a broadcast-related skin has been specified for display during the broadcast output (S1040). The controller 140 can separately specify a broadcast-related skin for display before the broadcast output.

For example, the controller 140 may specify a broadcast-related skin for display according to a broadcast channel criterion, a broadcast program criterion, a broadcasting service provider criterion, a time criterion or a place criterion. The controller 140 may specify the broadcast related skin in response to a user's selection or according to conditions contained in the broadcast-related skin.

The controller 140 determines whether a "selection signal" has been generated for selection of any one of the broadcast-related skins stored in the storage unit 150 when there is no broadcast-related skin specified (S1050). The selection signal is generally generated in response to the user's selection.

The controller 140 displays a broadcast-related skin corresponding to the selection signal while outputting the received broadcast signal (S1060) if a selection signal was generated. On the other hand, the controller 140 displays a basic broadcast-related skin while outputting the received broadcast signal (S1070) if no selection signal was generated. The basic broadcast-related skin refers to a broadcast-related skin set as a default when no specific broadcast-related skin is selected.

The controller 140 displays the specified broadcast-related skin while outputting the received broadcast signal (S1080) if a broadcast-related skin is specified. The controller 140 can display a broadcast-related skin selected by the user, selected according to the highest frequency of use or selected according to the most recently stored skin if from previous use.

Figure 11A:
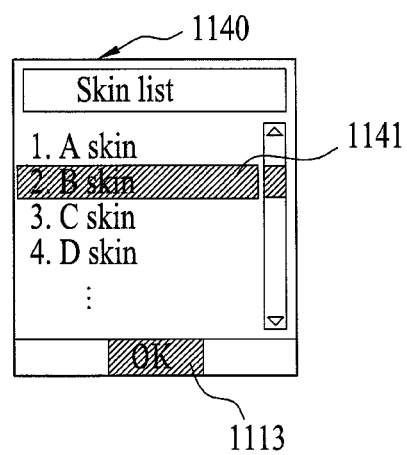
FIGS. 11A and 11B are state diagrams illustrating an embodiment of a process of displaying a broadcast-related skin on a screen according to the present invention during broadcast output when the broadcast-related skin is specified before the broadcast output.
Figure 11B:
Figure 12A:
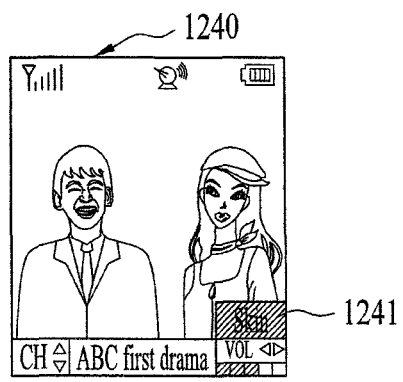
FIGS. 12A to 12C are state diagrams illustrating an embodiment of a process of displaying a broadcast-related skin on a screen according to the present invention during broadcast output when the broadcast-related skin is specified during the broadcast output.
Figure 12B:
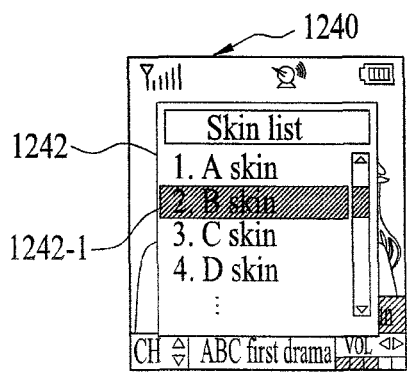
Figure 12C:
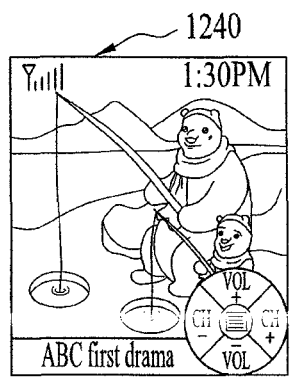

A description will be given of a process for outputting a broadcast-related skin on the screen. A description is given for both the case where a broadcast-related skin is specified before broadcast output and the case when the broadcast-related skin is specified during broadcast output. FIGS. 11A and 11B illustrate the case when the terminal 100 specifies a broadcast-related skin before broadcast reception or broadcast output. FIGS. 12A, 12B and 12C illustrate the case where there is no broadcast-related skin specified.

For example, the terminal 100 can display on the screen 1140 a list of broadcast-related skins stored in the storage unit 150 and the user can select any broadcast-related skin 1141 from the list. The terminal 100 then displays the selected broadcast-related skin while outputting the received broadcast signal on the screen 1140, as illustrated in FIG. 11B, upon receiving a broadcast signal.

As illustrated in FIG. 12A, the terminal 100 displays a basic broadcast-related skin while outputting a broadcast signal on the screen 1240. The terminal 100 displays a list 1242 of broadcast-related skins stored in the storage unit 150 while continuing to output the broadcast signal on the screen 1240, as illustrated in FIG. 12B, when "Skin" 1241 is selected in FIG. 12A.

The skin list 1242 may be displayed on one screen 1240 together with the output of the broadcast signal using a pop-up mode, an OSD mode, a PIP mode or a screen division mode. The terminal 100 displays "B skin" 1242-1 selected from the skin list 1242 while continuing to output the broadcast signal on the screen 1240, as illustrated in FIG. 12C.

As apparent from the above description, the information output method and the terminal according to the present invention has several advantages. First, various information can be provided during a wait time of a broadcast-related operation and the provided information can be specified by the user or broadcasting service provider. Second, an amount of the information not output during a broadcast-related operation can be provided to completion even though the broadcast-related operation is completed. Third, it is possible to output a non-output amount of information and perform an operation based on the completion of the broadcast-related operation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying broadcast content in a terminal when a broadcast-related operation is performed, the method comprising:
   receiving first content obtained from a newly selected broadcast channel;
   outputting an audio signal and video signal of second content different than the first content;
   determining whether to output the second content continuously after the completion of the broadcast-related operation based on a number of output times of the second content if the second content has not yet been output completely;
   converting, based on the determination, the audio signal of the second content that has not yet been output into converted text and outputting the converted text with an audio signal and video signal of the first content without outputting the audio signal and video signal of the second content if the number of output times of the second content is below a predetermined number; and
   no longer outputting the converted text if the number of output times of the second content is above the predetermined number.

2. The method according to claim 1, wherein the first content comprises at least audio, video or text.

3. The method according to claim 1, wherein the second content comprises an advertisement.

4. The method according to claim 1, further comprising:
   switching from a current broadcast channel to the newly selected broadcast channel prior to receiving the first content.

5. The method according to claim 1, further comprising:
   searching available broadcast channels to identify the newly selected broadcast channel prior to receiving the first content.

6. The method according to claim 1, further comprising:
   determining that a current broadcast channel is unavailable for continued display; and
   switching from the current broadcast channel to the newly selected broadcast channel prior to receiving the first content.

7. The method according to claim 1, further comprising:
   receiving a purchase request for the newly selected broadcast channel prior to receiving the first content.

8. The method according to claim 1, further comprising:
   receiving the second content via either a broadcast network or a mobile communication network within which the terminal operates.

9. The method according to claim 1, further comprising:
   receiving the second content from storage located within the terminal.

10. The method according to claim 1, further comprising:
    receiving the second content from a remote server.

11. The method according to claim 1, wherein the second content comprises one of a plurality of different types of content and further comprising:
    deleting a certain amount of the plurality of different types of content when an amount of the plurality of different types of content exceeds a threshold.

12. The method according to claim 1, wherein the second content comprises content obtained from the newly selected broadcast channel.

13. The method according to claim 1, further comprising:
    determining if the second content is received from a broadcasting network or a mobile communication network;
    outputting the second content in real time if it is determined that the second content is received from the broadcasting network or the mobile communication network; and
    receiving the second content from a memory of the terminal and outputting the second content if it is determined that the second content is not received from the broadcasting network or the mobile communication network.

14. The method according to claim 1, wherein the number of output times of the second content is determined whenever the second content is output.

15. A terminal for displaying broadcast content when a broadcast-related operation is performed, the terminal comprising:
    a broadcasting module receiving broadcast content;
    an output unit outputting information; and
    a controller that:
    controls the broadcasting module to receive first content obtained from a newly selected broadcast channel;
    controls the output unit to output an audio signal and video signal of second content different than the first content;
    determines whether to output the second content continuously after a completion of the broadcast-related operation based on a number of output times of the second content if the second content has not yet been output completely,
    converts, based on the determination, the audio signal of the second content that has not yet been output into converted text and controls the output unit to output the converted text with an audio signal and video signal of the first content without controlling the output unit to output the audio signal and video signal of the second content if the number of output times of the second content is below a predetermined number; and controls the output unit to no longer output the converted text if the number of output times of the second content is above the predetermined number.

16. The terminal according to claim 15, wherein the first content comprises at least audio, video or text.

17. The terminal according to claim 15, wherein the second content comprises an advertisement.

18. The terminal according to claim 15, wherein the controller further controls the broadcasting module to switch from a current broadcast channel to the newly selected broadcast channel prior to the broadcasting module receiving the first content.

19. The terminal according to claim 15, wherein the controller further controls the broadcasting module to search available broadcast channels to identify the newly selected broadcast channel prior to the broadcasting module receiving the first content.

20. The terminal according to claim 15, wherein the controller further:
    determines that a current broadcast channel is unavailable for continued display; and
    controls the broadcasting module to switch from the current broadcast channel to the newly selected broadcast channel prior to the broadcasting module receiving the first content.

21. The terminal according to claim 15, further comprising:
    an input unit receiving a purchase request for the newly selected broadcast channel prior to the broadcasting module receiving the first content.

22. The terminal according to claim 15, wherein the broadcasting module further receives the second content via either a broadcast network or a mobile communication network within which the terminal operates.

23. The terminal according to claim 15, further comprising a storage unit storing information, wherein the controller further receives the second content from the storage unit.

24. The terminal according to claim 15, wherein the broadcasting module further receives the second content from a remote server.

25. The terminal according to claim 15, wherein:
    the second content comprises one of a plurality of different types of content; and
    the controller further deletes a certain amount of the plurality of different types of content when an amount of the plurality of different types of content exceeds a threshold.

26. The terminal according to claim 15, wherein the second content comprises content obtained from the newly selected broadcast channel.

27. The terminal according to claim 15, wherein the controller further:
    determines if the second content is received from a broadcasting network or a mobile communication network;
    controls the output unit to output the second content in real time if it is determined that the second content is received from the broadcasting network or the mobile communication network; and
    receives the second content from a memory of the terminal and controls the output unit to output the second content if it is determined that the second content is not received from the broadcasting network or the mobile communication network.

28. The mobile terminal according to claim 15, wherein the controller further determines the number of output times of the second content whenever the output unit is controlled to output the second content.

* * * * *